United States Patent
Wehling (10) Patent No.: US 9,650,161 B2
(45) Date of Patent: May 16, 2017

(54) PACKING MACHINE AND METHOD FOR FILLING OPEN SACKS

(75) Inventor: Mark Wehling, Ennigerloh (DE)

(73) Assignee: HAVER & BOECKER OHG, Oelde (DE)

( * ) Notice: Subject to any disclaimer, the term of this patent is extended or adjusted under 35 U.S.C. 154(b) by 547 days.

(21) Appl. No.: 14/116,526

(22) PCT Filed: May 2, 2012

(86) PCT No.: PCT/EP2012/001872
§ 371 (c)(1),
(2), (4) Date: Feb. 3, 2014

(87) PCT Pub. No.: WO2012/152401
PCT Pub. Date: Nov. 15, 2012

(65) Prior Publication Data
US 2014/0311623 A1    Oct. 23, 2014

(30) Foreign Application Priority Data

May 9, 2011    (DE) .......................... 10 2011 101 045

(51) Int. Cl.
*B65B 1/22*    (2006.01)
*B65B 1/34*    (2006.01)
(Continued)

(52) U.S. Cl.
CPC ................. *B65B 1/22* (2013.01); *B65B 1/32* (2013.01); *B65B 1/34* (2013.01); *B65B 1/36* (2013.01);
(Continued)

(58) Field of Classification Search
CPC .... B65B 1/32; B65B 1/36; B65B 1/46; B65B 1/48; B65B 1/22; B65B 3/16; B65B 3/17; B65B 3/045
(Continued)

(56) References Cited

U.S. PATENT DOCUMENTS

| 4,090,344 A | 5/1978 | Kelly |
| 4,589,454 A * | 5/1986 | Kelley ...................... B65B 1/18 137/240 |

(Continued)

FOREIGN PATENT DOCUMENTS

| DE | 3408005 | 9/1985 |
| DE | 4447051 | 7/1996 |

(Continued)

*Primary Examiner* — Timothy L Maust
*Assistant Examiner* — Timothy P Kelly
(74) *Attorney, Agent, or Firm* — Pearn & Gordon LLP (57) ABSTRACT

Packaging machine and method for filling open-mouth bags comprising a filling spout, wherein by way of a motion oriented upwardly relative to the filling spout an open-mouth bag can be appended to the filling spout. A dosing device and a weighing device are provided for weighing a pre-defined quantity of a product intended for bagging. A volume flow control device is provided to control during the filling process a strength of the volume flow into the open-mouth bag in dependence on the time. The volume flow control device comprises a filling element and a control device to control during the filling process a strength of the volume flow into the open-mouth bag in dependence on the filling process so as to keep the top bag wall of the open-mouth bag substantially free of product intended for bagging. The filling element serves as a dosing device to transport the product intended for bagging from a dispensing silo into the open-mouth bag. The weighing device is configured as a gross-weighing device to determine during the filling process a measure for the weight filled into the open-mouth bag. A compactor is operated during the filling process.

16 Claims, 3 Drawing Sheets

(51) Int. Cl.
*G01G 13/04* (2006.01)
*B65B 1/32* (2006.01)
*B65B 1/36* (2006.01)
*B65B 1/48* (2006.01)
*B65B 1/10* (2006.01)

(52) U.S. Cl.
CPC ............... *B65B 1/48* (2013.01); *G01G 13/04* (2013.01); *B65B 1/10* (2013.01)

(58) Field of Classification Search
USPC .................. 141/10, 71–80, 83, 114, 95, 198, 141/313–314
See application file for complete search history.

(56) References Cited

U.S. PATENT DOCUMENTS

| | | | |
|---|---|---|---|
| 5,109,893 A | * 5/1992 | Derby | B65B 1/26 141/10 |
| 5,810,060 A | * 9/1998 | Bolz | B65B 31/02 141/287 |
| 6,000,444 A | 12/1999 | Ishikawa et al. | |
| 7,866,353 B2 | 1/2011 | Combrink | |
| 8,069,882 B2 | 12/2011 | Combrink | |
| 2008/0257450 A1 | 10/2008 | Combrink | |
| 2011/0056585 A1 | 3/2011 | Combrink | |

FOREIGN PATENT DOCUMENTS

| | | |
|---|---|---|
| DE | 202008002663 | 2/2009 |
| DE | 102008020253 | 8/2009 |
| DE | 102008017942 | 10/2009 |
| EP | 0623810 | 11/1994 |
| EP | 1744984 | 1/2007 |
| GB | 791058 | 2/1958 |
| GB | 1001640 | 8/1965 |
| WO | 2005110849 | 11/2005 |

\* cited by examiner

PACKING MACHINE AND METHOD FOR FILLING OPEN SACKS

The present invention relates to a packaging machine and a method for filling open-mouth bags. The packaging machine according to the invention may be intended for bagging all kinds of bulk goods. This kind of system is particularly preferably used for bagging fine-grain products, i.e. for bagging fine and dusty products requiring extended filling and in particular compacting times.

A great variety of packaging machines for filling open-mouth bags have been disclosed in the prior art. For example so-called FFS packaging machines ("Form-Fill-Seal packaging machines") tend to be used for efficiently filling bulk materials into open-mouth bags. In these FFS packaging systems the bag that is open on top is manufactured within the machine or in an immediately preceding device. The machine has a roll of tubular sheet assigned to it from which the required open-mouth bags are continuously manufactured during operation. A considerable advantage of these FFS packaging machines consists in that the open-mouth bags can be manufactured in the actually required lengths. There is no need to employ preformed bags which are also more expensive.

FFS packaging machines process open-mouth bags of plastic sheets which may be waterproof. This is why open-mouth bags filled with hygroscopic materials—such as cement—are suitable for open-air storage after closing since their contents are reliably protected against moisture.

The drawback of known packaging machines for filling open-mouth bags is their limited filling capacity in particular when bagging dusty, fine-grain products since these products must as a rule be deaerated to provide a firm package in which the smallest possible amount of air is contained. Entrapped air moreover reduces the stacking capability.

When filling dusty fine-grain products into air-permeable valve bags the valve bag is received air-tight at a horizontal filling spout. The filling process takes place under excess pressure. Immediately as the filling process begins, the valve bag is filled as quickly as possible and placed under considerable excess pressure or superpressure by means of continued filling in of bulk material. The excess pressure leads to effective deaeration through the air-permeable outer wall or through dedicated air relief valves. During the filling process the weight of the valve bag is continuously captured in a gross weighing procedure. The rotational speed of the conveyor element is reduced as the coarse stream phase ends and the fine stream phase begins. Moreover the flow cross-section is reduced by partially closing a scissor valve so that the filling process is considerably decelerated in the fine stream phase as the intended filled weight is nearly reached. By way of fine stream filling at the end of the filling process the weight accuracy can be improved. Following a sufficient waiting period during which the valve bag deaerates automatically the valve bag is discharged. The excess pressure in the valve bag may be monitored for example via a pressure sensor. In this way an efficient filling rate is enabled even for very fine-grain materials.

When filling bulk goods into open-top bags the filling process cannot occur under excess pressure since there is no closed system. Screw conveyors operate too slowly for efficient filling. Moreover care must be taken for the top inner edge of the open-mouth bag to not be contaminated. Namely, the open-mouth bag still requires to be closed at its top edge by way of a welding seam, glued seam, or other type of joint seam. This will not always function sufficiently reliably if one or both of the walls to be connected with one another are contaminated at the seam e.g. in particular by bulk materials obstructing welding. If the wall portion intended for welding is contaminated with bulk material particles prior to welding then the stability of a welding seam can be considerably less than in the case of clean bag walls. Furthermore the reproducibility of the welding seams suffers. This may in transport lead to defective bags so that the ambience can be considerably contaminated.

Open-top and water-tight bags cannot be deaerated outwardly through the bag wall. These open-mouth bags can only be deaerated upwardly through the top bag opening. When filling open-mouth bags it is therefore advantageous for efficiently deaerating the bag interior if the filling level in the open-mouth bag is maintained the highest possible during the majority of the filling process since deaeration will thus be accelerated. For the reasons indicated above contamination of the top bag edge should be avoided.

EP 1 744 984 B1 discloses a device and a method for filling open-top containers providing a net-weight weighing device arranged above a hopper arrangement opening into a filling spout above the container intended for filling. The filling spout extends into the container. A compacting device is provided for compacting the product filled into the container. Downstream of the net-weighing device an intermediate chamber is positioned which is disposed in the product path upstream of the container. The intermediate chamber serves to temporarily hold at least part of the product dispensed by the net-weighing device. The intermediate chamber is disposed at the hopper device, comprising an intermediate dosing device for controlling the volume flow over the duration of the filling process so as to attain the highest possible filling level in the open-top container intended for filling while at the same time the container will not be overfilled during the filling process. Overfilling would result in product congestion in the top region of the bag opening and thus contaminate with product at least the inner bag wall which would inhibit the later closing by welding and considerably increase the risk of defective bags.

Such a known packaging machine operates reliably as a rule. The instrumentation involved is, however, extensive. Moreover in the case of e.g. poorly flowing bulk goods, caking may occur within the product path. When part of the product intended for filling cakes at the wall then the currently processed container will be underweight. When caking loosens then the next container will show overweight. It may also be a disadvantage that e.g. if overfilling still occurs, caking product may after bag discharge, separate out of the processing path or from the walls, contaminating the ambience.

It is therefore the object of the present invention to provide a packaging machine for filling open-mouth bags and a method for filling open-mouth bags which allow efficient filling of open-mouth bags particularly involving reduced complexity.

This object is solved by a packaging machine having the features of claim 1. The method according to the invention is the subject matter of claim 10. Preferred specific embodiments are indicated in the subclaims. Further advantages and features of the invention can be taken from the exemplary embodiment and the general description.

The packaging machine according to the invention serves for filling open-mouth bags and comprises at least one filling spout having at least one filling opening. By way of a motion oriented upwardly relative to the filling spout an open-mouth bag can be appended to the filling spout. At least one dosing device and at least one weighing device are provided for weighing a pre-defined quantity of a product intended for bagging. A volume flow control device is provided to control during the filling process a strength of the volume flow into the open-mouth bag in dependence on the time. The volume flow control device comprises a filling element and a control device to control during the filling process a strength of the volume flow into the open-mouth bag in dependence on the time so as to keep the top bag wall of the open-mouth bag substantially free of product intended for bagging. The filling element is intended as the dosing device to transport the product intended for bagging from a dispensing silo into the open-mouth bag. The weighing device is configured as a gross-weighing device to determine during the filling process a measure for the weight filled into the open-mouth bag. In particular at least one compactor is provided that can be operated during the filling process.

The volume flow control device controls in particular the filling rate.

The packaging machine according to the invention has many advantages. The packaging machine according to the invention allows to reliably and efficiently fill bulk goods into open-mouth bags or open-top containers involving reduced complexity. The volume flow control device serves to dose the volume flow in such a way as to enable efficient filling of the open-mouth bags. In particular is the filling element controlled by the control device such that the filling level of the product filled into the open-mouth bag is high and in particular the highest possible during the entire filling process so as to enable effective deaeration of the bulk material intended for bagging.

Due to the fact that the volume flow control device comprises the filling element and a control device and due to the fact that the filling element serves as a dosing device for transporting the bulk material intended for filling from the dispensing silo into the open-mouth bag, the technology involved is considerably reduced compared to the packaging machine known from the prior art. The known packaging machine requires a first dosing device which fills the respective quantity of product into the container of the net-weighing device. When the quantity of the product intended for filling has been weighed in the container of the net-weighing device and an open-mouth bag intended for filling has been appended to the filling spout, then the dosing gate is opened and the bulk material intended for bagging is conveyed into the intermediate chamber. A second dosing device therein serves as an intermediate dosing device for a time-controlled strength of the volume flow.

The intermediate dosing device in the known prior art allows a time-controlled strength of the volume flow so that overflow of the open-mouth bag intended for filling can be prevented. When the filling level in the open-mouth bag intended for filling rises up to the filling spout or into the filling spout, then the bulk material intended for bagging can contaminate the top region of the bag wall. When the top bag wall of the open-mouth bag is closed later on by welding or the like, product caking at the bag wall may result in a defective closing seam which may cause leakage of the filled bulk material. It is also possible that in the case of high stresses the open-mouth bag bursts at a defectively closed seam leading to contamination of the ambience which should be avoided. In the known prior art this is solved by way of providing two separate dosing devices and one net-weighing device. The weighing device and the volume dosing device are separate from one another.

The present invention, however, allows to dose by way of one filling element only both the bulk material quantity intended for bagging and to control the volume flow over time so as to allow on the one hand high filling levels during the entire filling process while on the other hand the entire bulk material intended for bagging does not get directly into the open-mouth bag.

In the case of the bulk goods intended for bagging the bulk material getting into the bag tends to show a volume increased by 20% due to entrapped air. If the entire bulk material would directly pass free-falling into the open-top bag, then the bag volume would not be large enough for receiving the entire bulk material. Only following deaeration will the bulk material volume be reduced such that it fits into the open bag in its entirety. Therefore the control of the volume flow over the time of the filling process allows to efficiently, and according to the invention simply, realize a volume flow control device.

The filling element may comprise a filling turbine, a ventilation system or the like.

In a preferred specific embodiment the filling element comprises a filling turbine whose conveying speed can be variably controlled. In a simple and preferred configuration the conveying speed of the filling turbine is controlled in indexed operation. It is preferred for the filling turbine to be periodically switched on and off to control the conveying speed and thus the strength of the volume flow over the time. For some products it has been found that an indexed operation of the filling turbine is advantageous and that such operation shows particularly few cakings within the filling path. Suitably choosing the conveying and switch-off periods allow to set any desired strength of the volume flow.

Preferably the product level is always maintained high—though beneath the top bag wall. This will improve deaeration. Moreover a compactor will work more effectively.

In another specific embodiment it is preferred for the filling element to comprise or include at least one stop valve. The stop valve may in particular be configured as a lock valve or scissors or a squeeze valve. For example such a stop valve may have two or more stages and close off part or all of the cross-section of the filling path to adjust the conveying speed of the filling element by way of adjusting the cross-section of the filling path and/or to seal the filling path off. It is possible that as part or all of the filling path is locked the speed of rotation of the filling turbine, which may also be called a star wheel gate, is reduced or stopped entirely.

In all the configurations it is preferred to provide at least one sensor for capturing at least one filling level. The sensor may for example be capacitive, inductive, or optical or acoustic, to detect the material intended for bagging and the filling level of the product intended for bagging inside the open-mouth bag. The control device controls the flow rate of the product intended for bagging in dependence on the signal from the at least one sensor. This can be done by locking part or all of the filling path and it may comprise adjustment of the conveying speed of the filling turbine.

The volume flow control device is preferably set up and configured to cause the strength of the volume flow into the open-mouth bag to decrease and increase multiple times and in particular periodically. The volume flow control device can operate the filling element slower and then faster again multiple times, and/or periodically lock a path of the product intended for bagging to a greater or lesser extent.

In all of the configurations it is particularly preferred for the compactor to be operated at least during part of and in particular during the entire filling process.

It is particularly preferred that at least one compactor acts on the bottom of the open-top bag intended for filling. In particular at least one compactor is provided configured to dive into the open-mouth bag from above during the filling process. Such a compactor diving from above into the open-mouth bag may for example be configured as, or at least comprise, a vibrating device and in particular a poker vibrator or vacuum lance or the like.

The compactor diving from above into the open-mouth bag is in particular inserted into the open-mouth bag through the filling spout. The filling process is preferably controlled so that that part of the compactor used for compacting such as the poker vibrator, is at least substantially covered in the product intended for filling during the filling process to ensure the highest possible efficiency.

Surprisingly it has been found that operating the compactor during the filling process does not adversely affect the filling result. The weighing device presently operating by gross-weighing weighs the filling spout, the compactor, the framework supporting the compactor and the filling spout, and the open-mouth bag intended for filling including any product present therein.

Even a compactor configured as a vibrating or jolting device vibrating at a high frequency does not adversely affect the measurement result of the weighing device if a suitable filter filters the measurement values. The measurement values can for example be determined via a floating mean or the theoretically expected weight curve may be interposed with the weight curve that is measured over time. This allows an effective, sufficiently precise control of the filling process, even if the compactor is permanently activated.

In all the configurations the filling element is disposed in, at, or in close proximity to, the dispensing silo. It is possible for the packaging machine to be configured as a rotary packaging machine, comprising multiple filling spouts disposed at, and rotating along with, the packaging machine. In particular is the packaging machine configured as a continuously rotating packaging machine. In this way a bag former can be installed upstream of the packaging machine and optionally a closing device installed downstream of the packaging machine for appending the open-mouth bags to the packaging machine filling spouts for filling and closing the filled open-mouth bags by way of a closing seam.

In the case of a rotary packaging machine, the arrangement of the filling element in the dispensing silo shows the advantage among other things that a stock of more product can be filled into the dispensing silo even during operation. If a net-weighing device is provided which first meters the product intended for filling by means of a first dosing device to thereafter convey the metered bulk material to an intermediate dosing device, then filling into the net-weighing device is possible in a rotary system only if a dispensing silo is disposed above which rotates along or while the net-weighing device is located in a specific angular position and the system operation is indexed and rotary.

The presently preferred solution allows to employ a dispensing silo which can even be refilled during a filling process. The filling of the dispensing silo is independent of the filling process of an open-mouth bag since metering is done during the filling process itself. In this way the dispensing silo may, for example in the case of a rotary system, be located in a center region in an open-top design into which material can be filled from above.

The directional upwardly motion for appending an open-mouth bag to a filling spout can be realized by an upwardly motion of the open-mouth bag to the filling spout wherein the open-mouth bag is appended to the filling spout by way of—in absolute terms—a directional upwardly motion of the open-mouth bag. Or else it is possible to have the filling spout travel downwardly for appending and dive into the readied, opened open-mouth bag to receive the open-mouth bag. Such a motion is also an upwardly motion of the open-mouth bag relative to the filling spout. It is also possible for the filling spout to travel downwardly and the open-mouth bag upwardly for appending the open-mouth bag.

The method according to the invention serves for filling open-mouth bags by means of a packaging machine wherein an open-mouth bag is appended to the filling spout by way of an upwardly motion directed relative to a filling spout. A dosing device and a weighing device are provided which weigh a pre-defined quantity of the product intended for filling. A volume flow control device cooperating with the weighing device is provided to control during the filling process a strength of the volume flow into the open-mouth bag in dependence on the time. The volume flow control device comprises a filling element and a control device and controls during the filling process a strength of the volume flow into the open-mouth bag in dependence on the time so as to keep the top bag wall of the open-mouth bag substantially free of product intended for bagging. The filling element transports as the dosing device the product intended for bagging from a dispensing silo into the open-mouth bag. The weighing device is configured as a gross-weighing device and determines during the filling process a measure for the weight filled into the open-mouth bag. Preferably at least one compactor is operated during the filling process at least temporarily.

The method according to the invention also has many advantages since defined filling of the open-mouth bag is possible. The filling level remains as high as possible over the longest possible time period during the filling process without contaminating the top bag wall. The method allows a cost effective and technically economical realization of a filling method, enabling high precision with little complexity.

Preferably a filling level is captured during the filling process and filling of product is controlled in dependence on the filling level. In this way it is possible to maintain a high filling level of the product intended for bagging during the filling process while at the same time overfilling and/or contamination of the top bag wall is safely avoided.

The filling element is in particular operated indexed and in particular it is periodically switched on and off. Preferably a filling path is periodically reduced and increased by the filling element. It is possible to close part or all of the filling path.

In all the configurations it is preferred for the filling rate of the filling process to be controlled variably. While this may be done through switching a filling turbine on and off, it may also be realized by way of controlling the speed of rotation of the filling turbine.

Further advantages and features of the present invention can be taken from the exemplary embodiment which will be described below with reference to the enclosed figures.

Figure 1:
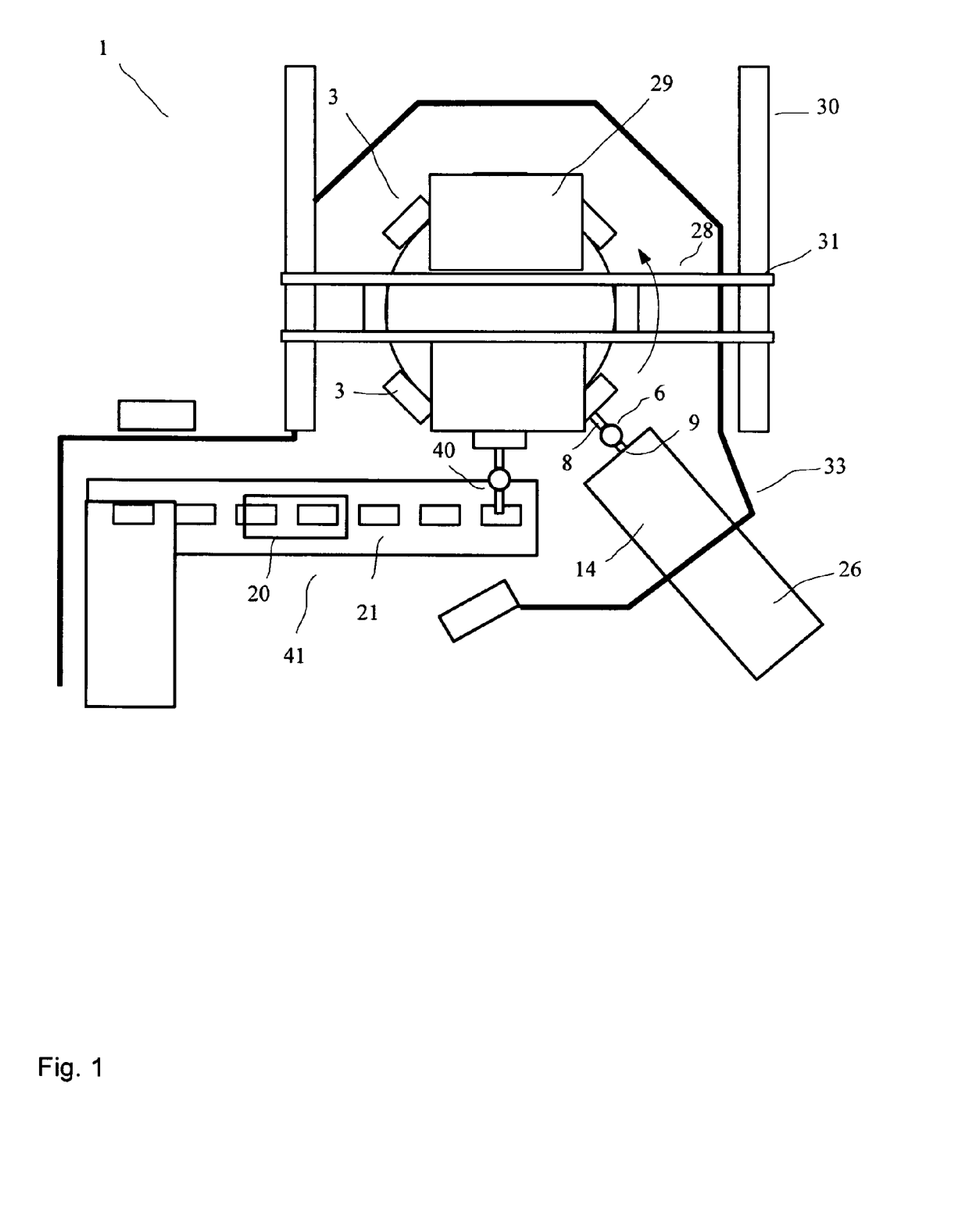
FIG. 1 schematic top view of a packaging machine according to the invention.

With reference to the enclosed figures an exemplary embodiment of a rotary packaging machine 1 according to the invention will be discussed below, which is illustrated in FIG. 1 in a schematic top view. The rotary packaging machine 1 serves for filling open-mouth bags 2 and is provided with multiple filling units 3 each of which is presently equipped with a filling spout 4. Between about two and sixteen filling units 3 can be disposed at the presently illustrated packaging machine 1. Basically it is also possible to install a still larger number of filling units at a rotary packaging machine 1. The packaging machine may also be configured as a stationary single-spout packaging machine.

The rotary packaging machine 1 is presently operated rotating continuously so that the filling units 3 rotate about a center axis at substantially constant speed. The speed depends in particular on the product intended for bagging and its compacting characteristics. The material intended for bagging is fed via an inlet hopper 29 and a silo 32 to the individual filling spouts 4 of the filling units 3. The silo 32 may comprise a separate dispensing silo 48 for each of the filling spouts 4 or each of the filling units 3 so that a separate intermediate silo is assigned to each of the filling spouts 4. In the case of a single-spout machine the silo 32 corresponds to the dispensing silo 48.

Figure 2:
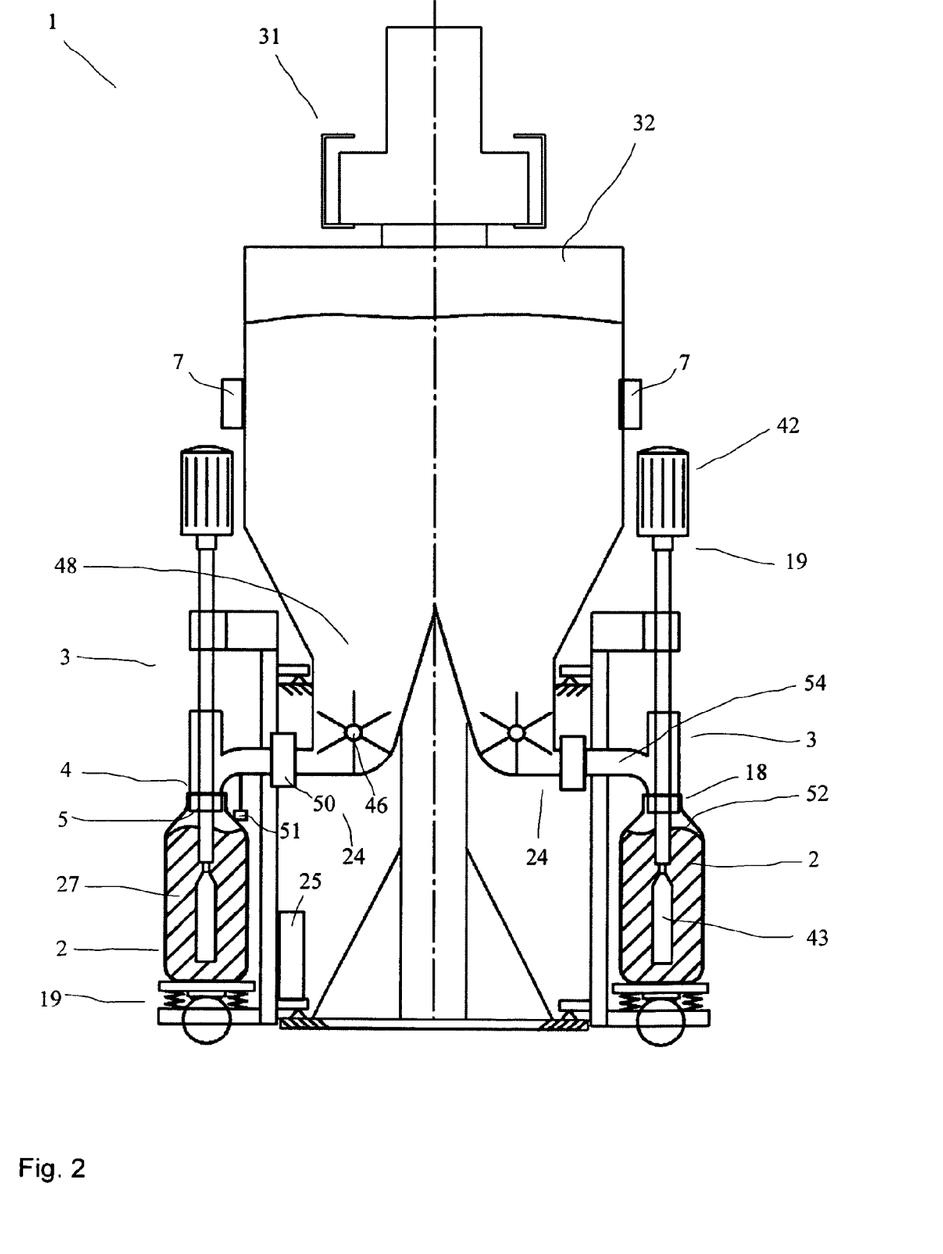
FIG. 2 a side view of the packaging machine according to FIG. 1.

The filling spouts 4 for filling the open-mouth bags 2 are presently aligned vertically so that the filling opening 5 is directed perpendicularly downwardly. Or else it is possible for the filling opening to be aligned at an inclination to the vertical. For example an angle of five degrees, ten degrees, or else twenty degrees to the vertical may be provided. Open-mouth bags 2 are appended from beneath to the bottom filling opening 5 of the filling spouts 4.

To this end an open-mouth bag 2 is gripped and the upper bag wall 18 is opened so as to form the upper bag opening. Suckers and grippers are preferably used so as to form at the top end of the open-mouth bag 2 a bag opening corresponding to the cross-sectional shape of the filling spout 4. In this way the open-mouth bag 2 is held in a defined position by its top bag wall 18 until the open-mouth bag 2 has been pushed onto the filling spout 4 where it is held again in a defined position by presently not shown grippers.

The open-mouth bags 2 are placed by way of a transfer device 6 positioned downstream of a bag former 26. The bag former 26 presently manufactures the individual open-mouth bags 2 from a tubular sheet during the continuous operation. Desired lengths 15 are cut off the tubular sheet and the bottom seams are inserted into the open-mouth bags 2. Or else, pre-fabricated open-mouth bags 2 may be used.

During rotation, which in this instance is counter-clockwise, the open-mouth bags 2 are filled. In other system configurations a clockwise rotation is possible. The filling process takes place during rotation. Simultaneously the compactors 19 which are provided at each filling unit 3 and which are height-adjustable, attain compacting of the product so that the product level is lowered. Due to the product being compacted the open-mouth bags 2 required are on the whole shorter and a tightly filled open-mouth bag 2 is formed that does not only use less sheet material but also offers an optically attractive appearance.

The sheet used for forming the open-mouth bags 2—unlike paper bags—results in a relatively low inherent stiffness of the open-mouth bags 2. This ensures precisely defined guiding of the open-mouth bags 2 at all times to enable comparatively short bag lengths and short bag material overhang 22 as well as reliable operation.

When the open-mouth bag 2 is filled with the intended quantity and reaches the angular position of the discharge device 40 then the open-mouth bag 2 is discharged from the filling spout 4. Discharge of the open-mouth bag 2 from the filling spout presently takes place during the continuous rotation of the packaging machine 1. The discharged bag 2 is transferred by the discharge device 40, which is likewise rotary, to the processing device 41 which comprises a linear guide 21 and one or more closing device(s) 20. The at least one closing device 20 closes the open top or mouth of the open-mouth bag 2. In discharge it is again always ensured that holding and guiding the open-mouth bag 2 is defined at all times so that a defined closing of the open-mouth bags 2 can be ensured.

A protective fence 33 may be provided to prevent access to the danger zone.

The rotary packaging machine 1 is preferably suspended from framework 30 with poles 31 supporting the rotary packaging machine. In the upper range of the rotary portion a silo 32 may be provided for intermediate product storage.

Each of the filling units 3 in the present exemplary embodiment is provided with two separate compactors 19. A compactor 19 is provided at the bottom end of the filling unit 3. The bag bottom of the open-mouth bag 2 intended for filling is at least during part of the filling process supported on the compactor 19 which is presently configured as a vibrating device and applies the vibrations in the vertical direction onto the open-mouth bag 2 intended for filling to compact the product 27 inside the open-mouth bag 2 during the filling process and to deaerate the product 27.

Furthermore another compactor 19 is provided which likewise applies vibrations into the filled bulk material. This compactor 19 comprises a drive 42 and a poker vibrator 43 which presently also acts via vibrations and during the filling process dives from above into the interior of the open-mouth bag 2 intended for filling. The filling spout 4 comprises a through hole through which the poker vibrator 43 can dive from above into the open-mouth bag 2 intended for filling.

Preferably the poker vibrator 27 dives from above through the filling spout 4 into the opened open-mouth bag 2 after the open-mouth bag 2 intended for filling has been appended. As the filling process is completed the poker vibrator 27 is pulled out upwardly.

It is also possible to append an open-mouth bag 2 intended for filling to the filling spout 4 from beneath while the poker vibrator is already extending downwardly through the filling spout if a suitable appending mechanism is provided for the open-mouth bag 2 intended for filling.

During the filling process a measure of the weight of the product 27 bagged thus far is determined continuously or at periodic intervals. To this end a weighing device 25 is provided which is presently configured as a gross-weighing device and which captures the weight of the filling spout and of the lower and upper compactors 19, and the weight of the bag and the bagged product 27 and the weight of the framework to which the compactors 19 and the filling spout 4 are attached. Since the single weight of each of the components involved is known, the measured total weight of the weighing device 25 allows conclusions about the weight of the bagged bulk material or product 27.

By way of the measurement result for the current weight the filling element 24 acting as the dosing device can be correspondingly controlled to introduce a precisely defined quantity of bulk material into the open-mouth bag 2 intended for filling.

The filling element 24 presently comprises a filling turbine 46 and a lock valve 50 disposed downstream in the product path which may for example be configured as a lock valve or a squeeze valve. The stop valve 50 is in particular provided in an elastic region of the filling path 54 disposed at the separation line between the weighed system and the dispensing silo 48. In this way a decoupling of the weighed system is achieved. The filling path 54 which is preferably formed by an elastic hose can be squeezed shut by a scissor valve or the like to close the filling path 54. Alternatively or supplementarily the filling turbine 46 may be reduced in rotational speed or shut off entirely.

Furthermore a sensor 51 may be provided which may be disposed external of the open-mouth bag 2 or else inside the open-mouth bag 2 during the filling process to determine a filling level 52 during the filling process. The sensor 51 may for example be designed for capacitive or inductive operation or it may determine the filling level 52 during the filling process for example by way of an ultrasonic or an optical method.

By means of a control device 7 which may be assigned to one filling unit 3 each or else which may assume central control of all the filling units 3, the dosing device or the filling element 24 may be controlled by way of the filling level values 52 determined, so that the filling level 52 is the highest possible while at the same time it does not reach up to the filling spout 4 so that contamination of the top edge of the bag wall 18 is reliably avoided.

This allows on the one hand to ensure a most efficient and fast filling while on the other hand the top edge of the bag wall 18 remains clean and a permanently stable closing seam after the filling process can be ensured.

It is also possible to correspondingly control the filling process without a sensor 51. In this way reference is for example made to data based on experience and the filling process for a product intended for filling is experimentally determined through testing so as to enable an optimal curve of the filling level.

For controlling the volume flow a volume flow control device 45 is used which presently consists of the control device 7 and the filling element 24.

Figure 3:
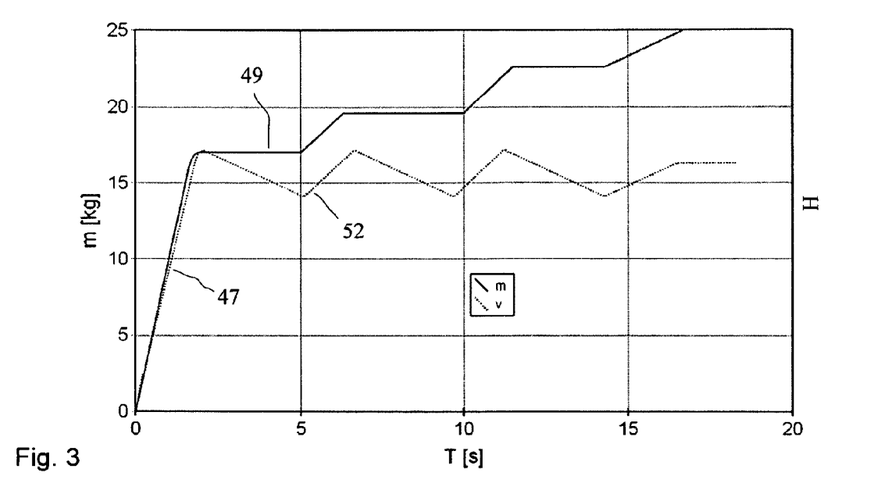
FIG. 3 the weight curve and the filling level curve of an open-mouth bag during the filling process.

FIG. 3 shows the typical weight curve and the filling level curve in a filling process.

The entire filling process presently takes about 17 seconds. In this example, 25 kg of bulk material is bagged. When the filling process is started the filling element is preferably operated at the maximum conveying speed to have a high volume flow enter the open-mouth bag intended for filling at the beginning of the filling process. The volume flow 47 ensues from the gradient of the weight 49 over the time T. As the filling level or the height H reaches an intended measure 58 which has either been determined empirically or else is detected by a sensor 51, the conveying speed 44 of the filling element 24 is reduced or even switched off.

Figure 4:
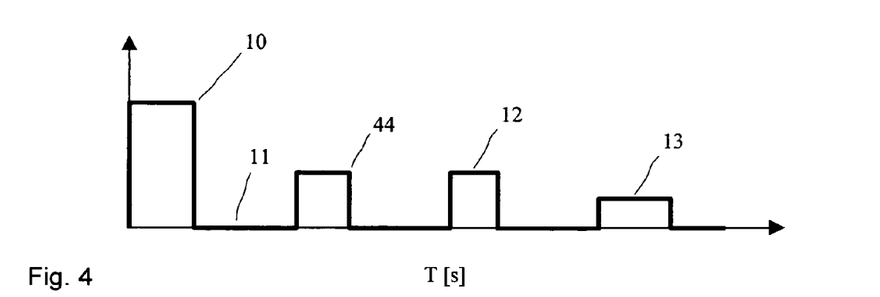
FIG. 4 the conveying speed of the conveyor element during the filling process illustrated in FIG. 3.

The conveying speed 44 of the filling element 24 is illustrated in FIG. 4 over the time T for the filling process according to FIG. 3.

At the beginning of the filling process the product intended for bagging 27 is conveyed into the open-mouth bag 2 intended for filling at the maximum conveying speed 10. For example the speed of rotation of a filling turbine 46 can be chosen to be particularly high as the filling process begins.

As the intended maximum filling level 58 is reached, the conveying speed 44 is reduced for example by switching the filling turbine off. The conveying speed 11 in the subsequent time interval consequently drops to zero. As the product level has dropped to a predetermined measure 59 by way of the concurrent compacting by the compactor 19, the filling turbine 46 is switched back on and is for example operated at a lower conveying speed 12 until the filling level 52 has again reached the intended maximum level 58.

There follows a settling phase in which the filling turbine remains once again switched off. By way of the concurrent compacting which also already occurs by natural liberation of gas and which is considerably increased by the compactors 19 the volume of the bulk material decreases over time. Finally the filling turbine 46 is switched on once again at the level 59 and product is once again filled into the open-mouth bag 2 intended for filling at the conveying speed 12. The weight of the filled product 27 increases correspondingly at the operating times of the filling turbine 46.

Near the end of the filling process, as the weight intended for filling has been nearly reached and for example only 10% of the weight intended for filling remain to be filled, the conveying speed 44 of the filling turbine 46 can be reduced still further and conveying may be continued for example at half the speed. This conveying speed 13 ensues near the end of the filling process so that the weight gradient over the time is correspondingly lower during the conveying speed 13 until the intended total weight is reached.

Not only four conveying intervals may certainly be present as they are illustrated in the FIGS. 3 and 4 but 5, 6 or more conveying intervals or less—for example 2 or 3 conveying intervals—may be provided until the open-mouth bag 2 is filled. The number and nature of intervals in particular depends on the product intended for bagging and also on the package size.

In other configurations it is also possible for the conveying speed 44 of the filling element 24 to be operated varying continuously such that, as the intended maximum filling level is reached, there will be no more volume increase but only—depending on the progressive compaction of the product—a weight increase until the pre-defined weight is reached.

It is possible to attain the reduced conveying speed 13 according to FIG. 4 by reducing the speed of rotation of the filling turbine 46. Or else it is possible to attain a reduction of the conveying speed 13 by closing part of the filling path 54 by means of the stop valve 50.

Figure 5:
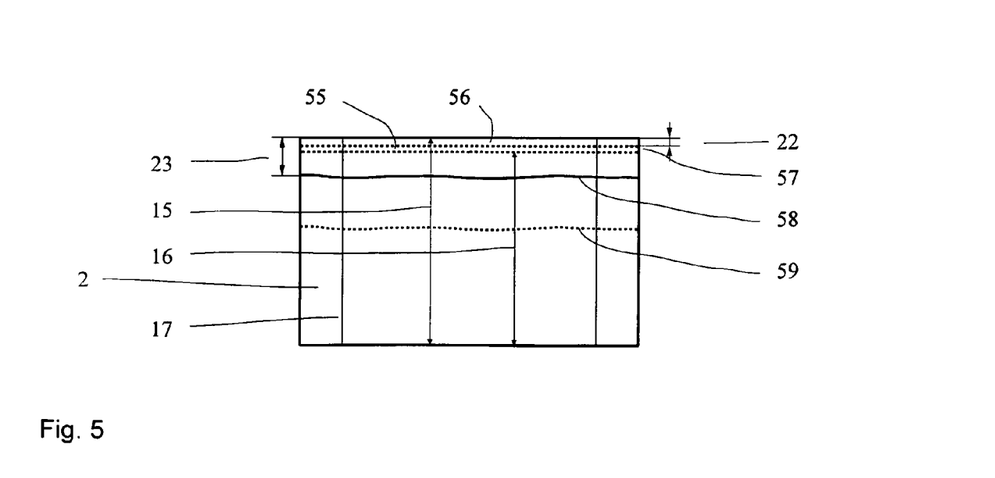
FIG. 5 a simplistic illustration of an open-mouth bag.

FIG. 5 shows an open-mouth bag 2, simplistic and not true to scale. The open-mouth bag 2 is closed after completion of the filling process by means of a joint seam or welding seam 55 which is presently inserted in a dashed line. The bag 2 has a length 15. After closing, the smallest possible distance 22 remains between the welding seam 55 and the top edge of the bag wall to save bag material. The open-mouth bag 2 may be gusseted 17.

During the filling process, bulk material gets into the open-mouth bag 2 from above wherein care is taken during filling that a maximum top filling level 58, which is drawn in not true to scale, is not exceeded.

As the maximum filling level 58 is reached, the filling process is decelerated or stopped while simultaneously a compactor is activated or continues operating. In this way and also by natural deaeration the open-mouth bag 2 is deaerated upwardly so that the filling level in the bag 2 drops and finally reaches the filling level 59. Then the volume flow into the open-mouth bag 2 is increased once again by the volume flow control device until the maximum filling level 58 is reached once again. Thereafter the volume flow control device reduces or stops the volume flow again so that the filling level is lowered again. Thereafter, as the filling level 59 is reached, the volume flow into the open-mouth bag 2 is increased again. This process continues until the intended end weight is obtained. The filling levels 58 and 59 can be variably matched to the filling process and filling level thus far.

At the maximum filling level 58 there is left a clear though the smallest possible distance 23 from the top edge of the bag 2. The measures and distances are illustrated schematically only in FIG. 5 to show the principle. Care is taken by way of the volume flow control device that during the filling process a distance 23 is maintained to prevent contamination of the top bag wall region. In this way it is ensured that the area in which the welding or joint seam 57 must be made in the bag wall, remains clean. Due to considerable contamination of the wall by particles of the bulk material intended for bagging the welding seam produced in this spot might turn out to be less resistant to loads than when a clean bag wall is welded.

The invention enables a simple structure that enables precise filling of bulk goods into open-mouth bags 2 at high speeds and very reliably. The fact that the filling element is not only employed as a dosing device for controlling the weight intended for bagging but also for controlling the conveying speed, allows to considerably reduce the structural height compared to prior art systems. An intermediate storage is not required so that the structural height may even be halved which considerably saves costs including for the enclosing installations since the building volume can be designed considerably smaller.

The reduced structural height also reduces the path that the product travels free-falling during the filling process. In this way the proportion of air entrained into the open-mouth bag 2 by the bulk material is also reduced. Trials have shown that the proportion of air can be reduced by 10, 20 or even 30% so as to require less compacting time. This in turn leads to a considerably more effective and faster filling.

Thus the packaging machine according to the invention enables higher filling rates with reduced complexity.

Moreover the shorter product path during the filling process helps to better avoid product caking. The more efficient filling also enables bagging poorly flowing products the bagging of which has proved impossible or difficult or only with employing additional steps in the prior art packaging machines.

| List of reference numerals: | |
| --- | --- |
| 1 | packaging machine |
| 2 | open-mouth bag |
| 3 | filling unit |
| 4 | filling spout |
| 5 | filling opening |
| 6 | transfer device |
| 7 | control device |
| 8 | gripping arm |
| 9 | gripping arm |
| 10 | conveying speed |
| 11 | conveying speed |
| 12 | conveying speed |
| 13 | conveying speed |
| 14 | bag feeding unit |
| 15 | bag length |
| 16 | height |
| 17 | gusset |
| 18 | bag wall |
| 19 | compactor |
| 20 | closing device |
| 21 | linear guide |
| 22 | overhang |
| 23 | distance |
| 24 | dosing device, filling element |
| 25 | weighing device |
| 26 | bag former |
| 27 | product |
| 28 | direction of rotation |

| -continued | |
| --- | --- |
| List of reference numerals: | |
| 29 | inlet hopper |
| 30 | framework |
| 31 | pole |
| 32 | silo |
| 33 | protective fence |
| 40 | discharge device |
| 41 | processing device |
| 42 | drive |
| 43 | poker vibrator |
| 44 | conveying speed |
| 45 | volume flow control device |
| 46 | filling turbine |
| 47 | volume flow |
| 48 | dispensing silo |
| 49 | weight |
| 50 | stop valve |
| 51 | sensor |
| 52 | filling level |
| 54 | filling path |
| 55 | welding seam |
| 56 | top bag wall |
| 57 | width of welding seam |
| 58 | maximum filling height |
| 59 | filling level |

The invention claimed is:

1. A packaging machine for filling open-mouth bags comprising
   at least one filling spout having at least one filling opening,
   wherein by way of a motion oriented upwardly relative to the filling spout an open-mouth bag can be appended to the filling spout,
   wherein a weighing device is provided for weighing a pre-defined quantity of a product intended for bagging,
   wherein a volume flow control device is provided, the volume flow control device comprising a filling element and a control device effective to control, during a filling process, a strength of the volume flow into the open-mouth bag in dependence both on an increase in weight and on a filling level so as to keep a top bag wall of the open-mouth bag substantially free of product intended for bagging,
   wherein the filling element is provided as a dosing device for transporting the product intended for bagging from a dispensing silo into the open-mouth bag,
   wherein the weighing device is configured as a gross-weighing device to determine, during the filling process a measure for the weight filled into the open-mouth bag, and
   wherein at least one compactor is provided that can be operated during the filling process.

2. The packaging machine according to claim 1 wherein the filling element comprises a filling turbine whose conveying speed can be variably controlled.

3. The packaging machine according to claim 1 wherein the filling element comprises a stop valve, the stop valve being a lock valve or a squeeze valve.

4. The packaging machine according to claim 1 wherein at least one sensor is provided for capturing a filling level.

5. The packaging machine according to claim 1 wherein the volume flow control device is set up and configured to cause the strength of the volume flow into the open-mouth bag to periodically decrease and increase multiple times.

6. The packaging machine according to claim 5 wherein the at least one compactor is provided as a vibrating device that is configured to dive into the open-mouth bag from above during the filling process.

7. The packaging machine according to claim 1 wherein the filling element is disposed in the dispensing silo.

8. The packaging machine according to claim 1,
wherein the packaging machine is configured as a rotary packaging machine, and
wherein the at least one filling spout comprises a plurality of filling spouts, each of the plurality of filling spouts being disposed around the rotary packaging machine.

9. The packaging machine according to claim 1 wherein the dispensing silo has an opening such that more product can be added to the dispensing silo during the filling process.

10. A method for filling open-mouth bags by means of a packaging machine, the method comprising:
appending an open-mouth bag to the filling spout by way of an upward motion directed relative to a filling spout;
weighing, by use of a weighing device, a pre-defined quantity of a product intended for bagging;
controlling, during a filling process and by use of a volume flow control device, a strength of the volume flow into the open-mouth bag in dependence on the filling process so as to keep a top bag wall of the open-mouth bag substantially free of product intended for bagging, the volume flow control device comprising a filling element and a control device, wherein the filling element is provided as a dosing device, which transports the product intended for bagging from a dispensing silo into the open-mouth bag;
determining, during the filling process and by use of the weighing device which is configured as a gross-weighing device, a measure for the weight filled into the open-mouth bag; and
operating at least one compactor during the filling process.

11. The method according to claim 10 wherein the volume flow is controlled in dependence on the filling time.

12. The method according to claim 10 wherein a filling level is captured during the filling process and the volume flow is controlled in dependence on the filling level.

13. The method according to claim 10 wherein a filling level of the product intended for bagging is retained high during the filling process while at the same time overflowing is avoided.

14. The method according to claim 10 wherein the strength of the volume flow into the open-mouth bag is set to decrease and increase multiple times and wherein the filling element is operated in an indexed manner and is periodically switched on and off.

15. The method according to claim 10 wherein a filling path is periodically reduced and increased by the filling element.

16. The method according to claim 10 wherein a filling rate of the filling element is controlled in a variable manner.

* * * * *